(12) United States Patent
Watanabe et al.

(10) Patent No.: US 8,493,928 B2
(45) Date of Patent: Jul. 23, 2013

(54) WIRELESS SYSTEM, FOR PACKET COMMUNICATION BETWEEN BASE STATION AND MOBILE STATIONS

(75) Inventors: Koji Watanabe, Kokubunji (JP); Yosuke Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1525 days.

(21) Appl. No.: 12/051,901

(22) Filed: Mar. 20, 2008

(65) Prior Publication Data

US 2009/0016299 A1 Jan. 15, 2009

(30) Foreign Application Priority Data

Jul. 11, 2007 (JP) ................................. 2007-181608

(51) Int. Cl.
*H04W 4/00* (2009.01)
*H04W 36/00* (2009.01)

(52) U.S. Cl.
USPC ........... 370/331; 455/436; 455/442; 455/443; 455/444

(58) Field of Classification Search
USPC ........................................................ 370/331
See application file for complete search history.

(56) References Cited

U.S. PATENT DOCUMENTS

| 2005/0213540 | A1* | 9/2005 | Matsumoto | 370/331 |
| 2006/0077994 | A1* | 4/2006 | Spindola et al. | 370/412 |
| 2006/0251130 | A1* | 11/2006 | Greer et al. | 370/508 |
| 2009/0016299 | A1* | 1/2009 | Watanabe et al. | 370/331 |
| 2009/0181673 | A1* | 7/2009 | Barrett | 455/436 |

FOREIGN PATENT DOCUMENTS

| JP | 2005-523595 A | 8/2005 |
| WO | 03/073774 A1 | 9/2003 |
| WO | 2006/044696 A1 | 4/2006 |

OTHER PUBLICATIONS

IEEE std. 802.16e-2005, 2006, pp. 323-330.
IEEE std. 802.16e-2005, 2006, pp. 179-186.
IEEE std 802.16-2004, 2006, pp. 22-24.

* cited by examiner

*Primary Examiner* — Huy C Ho
(74) *Attorney, Agent, or Firm* — Mattingly & Malur, PC

(57) ABSTRACT

Disclosed herewith is a wireless system capable of reducing packet sending delay occurrence and packet sending delay jittering at the time of hand-over processing executed therein. In the wireless system, upon estimating occurrence of a hand-over event, a subject mobile station and its base station extend the packet buffering period respectively and furthermore, the base station changes the current burst scheduling method for another. The base station and the mobile station then exchanges messages required to execute the hand-over procedure in a period between when sending of a burst ends and when sending of the next burst begins.

8 Claims, 15 Drawing Sheets

[RL SCHEDULING]

[FL SCHEDULING]

AT COMMUNICATION QUALITY MONITORING

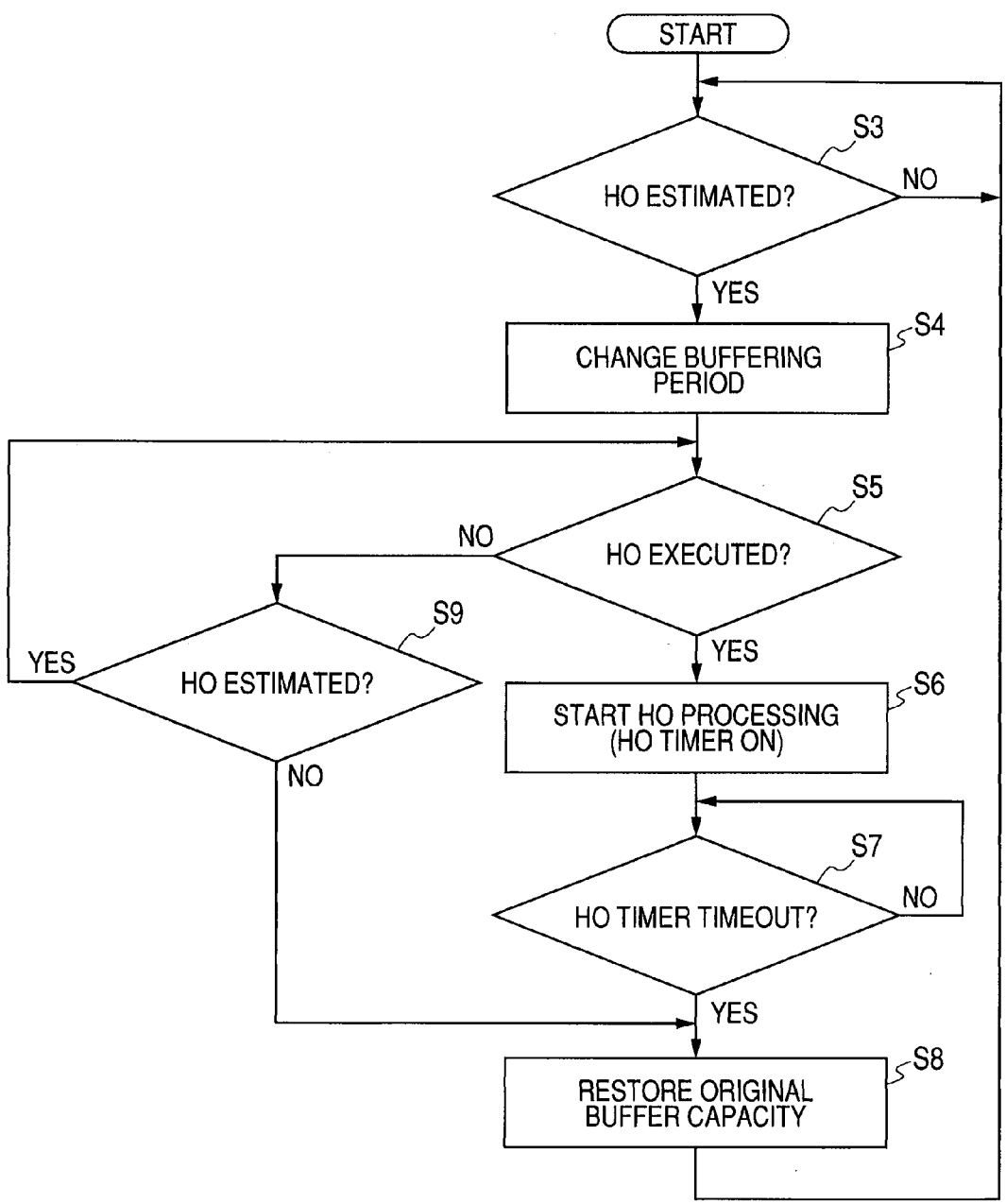

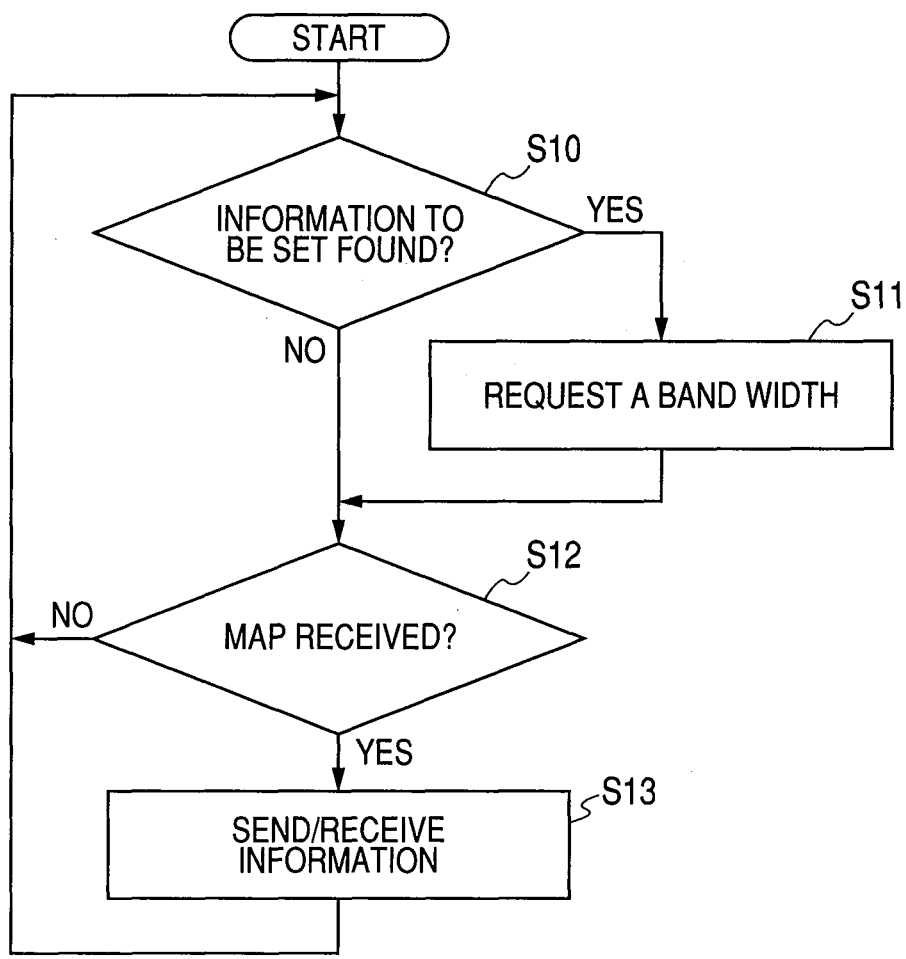

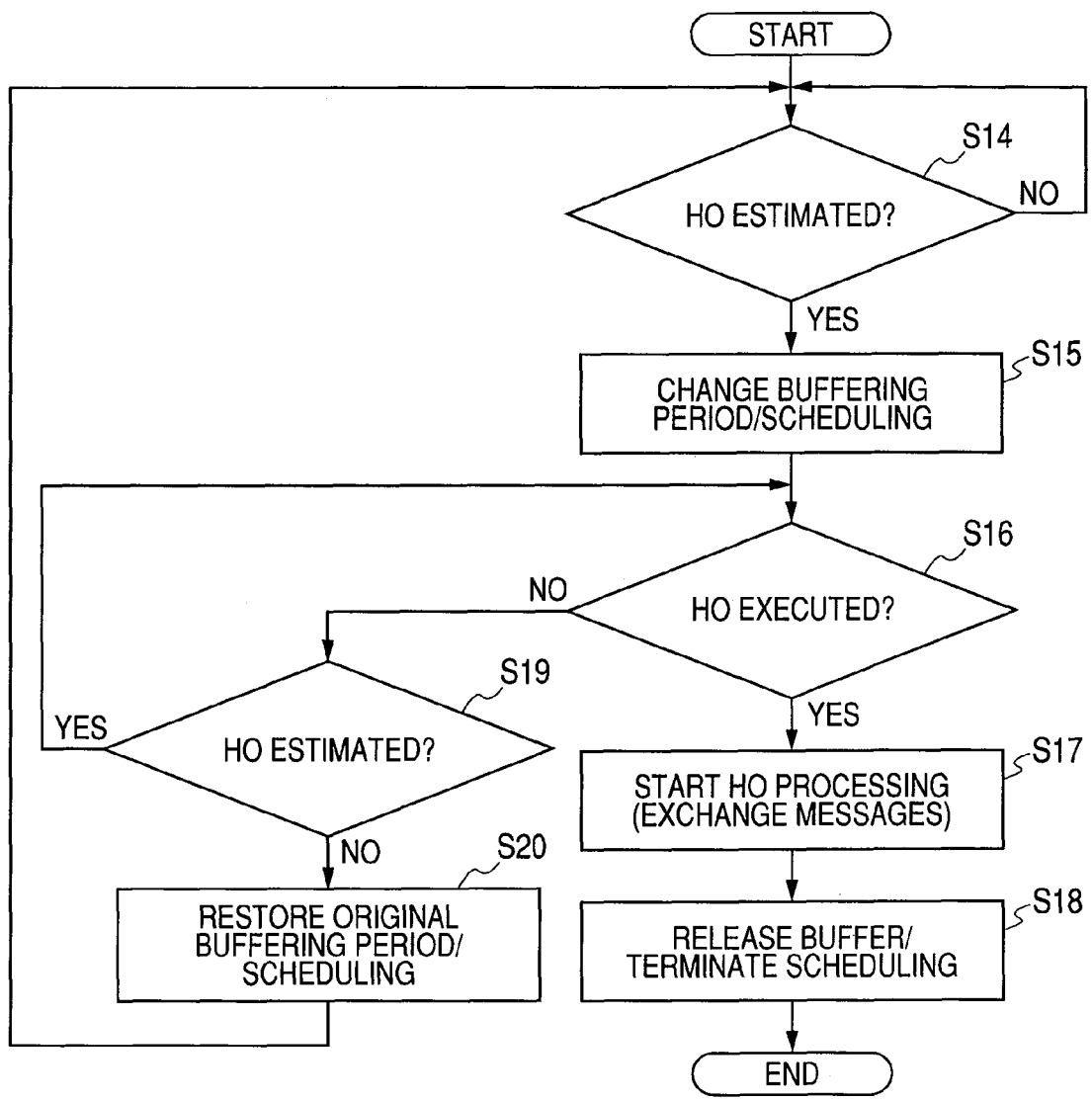

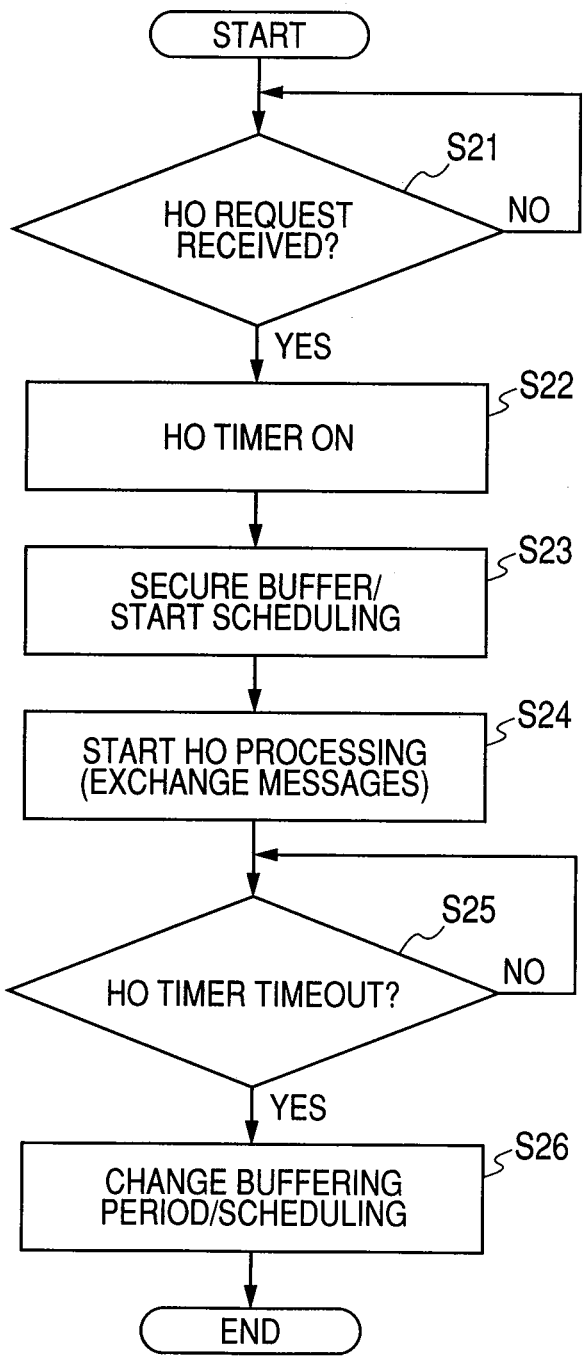

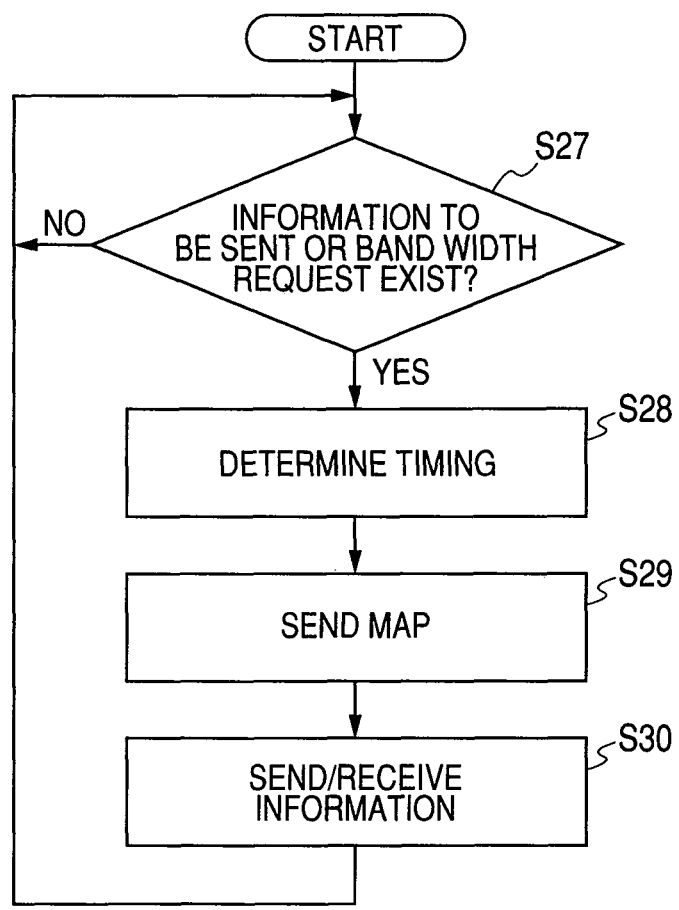

WIRELESS SYSTEM, FOR PACKET COMMUNICATION BETWEEN BASE STATION AND MOBILE STATIONS

CLAIM OF PRIORITY

The present application claims priority from Japanese application JP 2007-181608 filed on Jul. 11, 2007, the content of which is hereby incorporated by reference into this application.

FIELD OF THE INVENTION

The present invention relates to a wireless system employed for real time packet communications.

BACKGROUND OF THE INVENTION

In recent years, real time communications have widespread using means of VoIP (Voice over IP), TV phones, etc. in wireless system packet communication networks. Consequently, the traffics of such real time communications are now increasing more and more. On the other hand, as the functions of those wireless systems, such as QoS (Quality of Service) control, policy control, dynamic address assignment, authentication, etc. have been enhanced and complicated, the hand-over time have also been extended accordingly. Under such circumstances, keeping the real time communication quality even at such hand-over events is becoming one of the vital issues.

In a wireless system, a base station and a mobile station communicate wirelessly with each other in units of wireless sending information formed from such packets as those of the IP (Internet Protocol), etc. And in order to use its wireless resources efficiently by reducing occurrence of conflictions among information items to be sent and by reducing the wireless sending time, the wireless system schedules wireless packet sending by information units. For example, IEEE Std 802. 16e-2005, (Feb. 28, 2006)/IEEE Std 802. 16-2004/Cor1 6.3.5.2 discloses how a base station schedules data sending according to a band width request from a mobile station and its own necessary band width, as well as its procedure. IEEE Std 802. 16e-2005, (Feb. 28, 2006)/IEEE Std 802. 16-2004/Cor1 6.3.2.1.2.1.1 discloses message formats. IEEE Std 802. 16e-2005, (Feb. 28, 2006)/IEEE Std 802. 16-2004/Cor1 8.3.5.1 discloses wireless sending information formats.

SUMMARY OF THE INVENTION

FIG. 1 shows an example of a wireless system. AP (Access Point) 1 and AP2 denote base stations. AGW (Access Gate-Way) 3 denotes an access gateway. IP network 4 denotes an IP (Internet Protocol) network. CN (Correspondent Node) 5 denotes a corresponding node. AT (Access Terminal) 6, AT8, and AT10 denote mobile stations respectively. TE (Terminal Equipment) 7, TE9, and TE11 denote terminals respectively. HA (HomeAgent) 12 denotes a mobile IP home agent. AAA (Authentication Authorization and Accounting) 13 denotes a server used for authentication, authorization, and accounting. In this system, it is premised that TE7 and CN5 communicate with each other through AT6 and AP1.

FIG. 2 shows an example of an FL (Forward Link) packet sending timing of the AT6 at the time of hand-over from AP1 to AP2. Both AP1 and AP2 buffer packets inputted from the AGW3 for a buffering period Tb and each of the AP1 and AP2 sends a burst that is wireless sending information. The burst consists of some packets and is stored on a wireless medium.

Some application programs such as the VoIP, etc. receive fixed size packets at certain time intervals. For example, it is premised here that packets are generated at certain time intervals and when the AP1 completes sending of packets A, B, C, and D, the AT6 enables hand-over to be made from AP1 to AP2.

Thus the AP2 comes to input packets E, F, G, H, . . . that follow the packets A to D according to the predetermined hand-over procedure. However, because the predetermined hand-over procedure takes much time, the AP2 comes to receive packets E, F, and G collectively, then receive the subsequent packets H, I, . . . that arrive at the certain time intervals.

After completing wireless sending of some packets, if the AT6 controls so as to send the subsequent packets at fixed time intervals to the TE7, the AT6 cannot send the packet E after sending the packet D even when its sending timing is reached. In this case, packets cannot be sent from the AT6 to the TE7 at fixed time intervals, thereby packets E, F, G, H, . . . are often delayed and delay jittering occurrence increases. Furthermore, as a result of the QoS (Quality of Service) degradation to be caused by an increase of such delay jittering, etc., voices and images to be reproduced at the TE7 are disturbed.

And this problem arises not only in the sending in the forward link (FL) as shown in the example in FIG. 2, but also in the sending in the reverse link (RL). It is therefore an object of the present invention to reduce occurrence of packet sending delays, as well as occurrence of packet sending delay jittering at the time of hand-over processings.

Generally, packet sending delay jittering can be eliminated by adjusting the time interval of packets in the buffer at the receiver side of the subject sending block. This adjustment means changing delay types from variable delay to fixed delay. If an amount of delay jittering to be eliminated increases, the fixed delay to be added also comes to increase. Furthermore, as the added fixed delay increases, a required buffer capacity increases. In real time communications, sending delay and buffer capacity should preferably be suppressed to the minimum requirement. And another object of the present invention is to minimize such sending delay and buffer capacity.

In order to achieve the above objects, in a wireless system of the present invention, each mobile station includes a storage unit that holds packets and a unit that generates a burst from those packets held in the storage unit and each base station includes a storage unit that holds packets, a unit that generates a burst from those packets held in the storage unit, and a unit that schedules the bursts to be sent from itself and the mobile station, respectively. In this wireless system, the mobile station, if estimating a hand-over event, increases the packet buffering period and the base station increases the packet buffering period and changes the current scheduling method employed for bursts for another. The base station and the mobile station exchange messages required for the hand-over procedure in a period between the end of sending a burst and the start of sending another burst.

Due to this exchange of messages required for the hand-over procedure, the timing of information burst sending to a wireless medium is prevented from bad influences that might otherwise be exerted from such message exchanges.

The unit that changes the scheduling method described above changes a method for generating an information burst that stores packets inputted to a base station or mobile station in a first period repetitively and sending the generated burst wirelessly for a method for generating an information burst that stores packets inputted to a base station or mobile station in a second period that is longer than the first period repetitively and sending the generated burst wirelessly. Furthermore, the unit adjusts the above period so as to complete message exchanges required for the hand-over procedure between information bursts sent in each second period after the method change if the message exchange is not completed between information bursts sent in each first period before the method change.

Consequently, the timing of information burst sending to the wireless medium is prevented from bad influences that might otherwise be exerted from such message exchanges.

Each of the base station and the mobile station of the present invention expands the storage area (buffer capacity) allocated to its storage unit so as to hold more packets if the unit that estimates hand-over occurrence estimates occurrence of such a hand-over event.

According to an aspect of the present invention, therefore, the buffer capacity is changed at each of AT and AP and the scheduling method is changed at AP dynamically at the time of hand-over occurrence that might cause an increase of delay jittering occurrence, thereby the occurrence of packet sending delay jittering is reduced.

BRIEF DESCRIPTION OF THE DRAWINGS

FIG. 14 is another flowchart of the processings of the mobile station of the present invention;
FIG. 15 is still another flowchart of the processings of the mobile station of the present invention;
FIG. 16 is a flowchart of the processings of the base station of the present invention;
FIG. 17 is another flowchart of the processings of the base station of the present invention;
and
FIG. 18 is still another flowchart of the processings of the base station of the present invention.

DETAILED DESCRIPTION OF THE PREFERRED EMBODIMENTS

Hereunder, there will be described a wireless system, a base station, and a mobile station in the preferred embodiments of the present invention in detail with reference to the accompanying drawings.

This wireless system is used for packet communication hand-over from a mobile station to another among a plurality of base stations. Each of the mobile stations and base stations includes a storage unit that holds packets and a unit that generates an information burst from those packets held in the storage unit. Each base station includes a unit that schedules information bursts sent from the base stations and mobile stations. Either the mobile station or the base station includes a unit that estimates hand-over occurrence and the base station changes the current scheduling method for the other if the unit estimates hand-over occurrence. And the plural base stations and their mobile stations exchange messages required for the hand-over procedure in a period between sending operations of information bursts.

The "scheduling" mentioned above means determining a packet sending time, that is, a process for generating an information burst from packets and determining a timing for sending the information burst. The "scheduling method" mentioned above means a method for determining a sending timing at the time of scheduling, for example, determining the number of packets to be stored in an information burst and determining a time interval for sending bursts respectively.

[Example of FL Dynamic Buffering/Scheduling Method Change]

Figure 3:
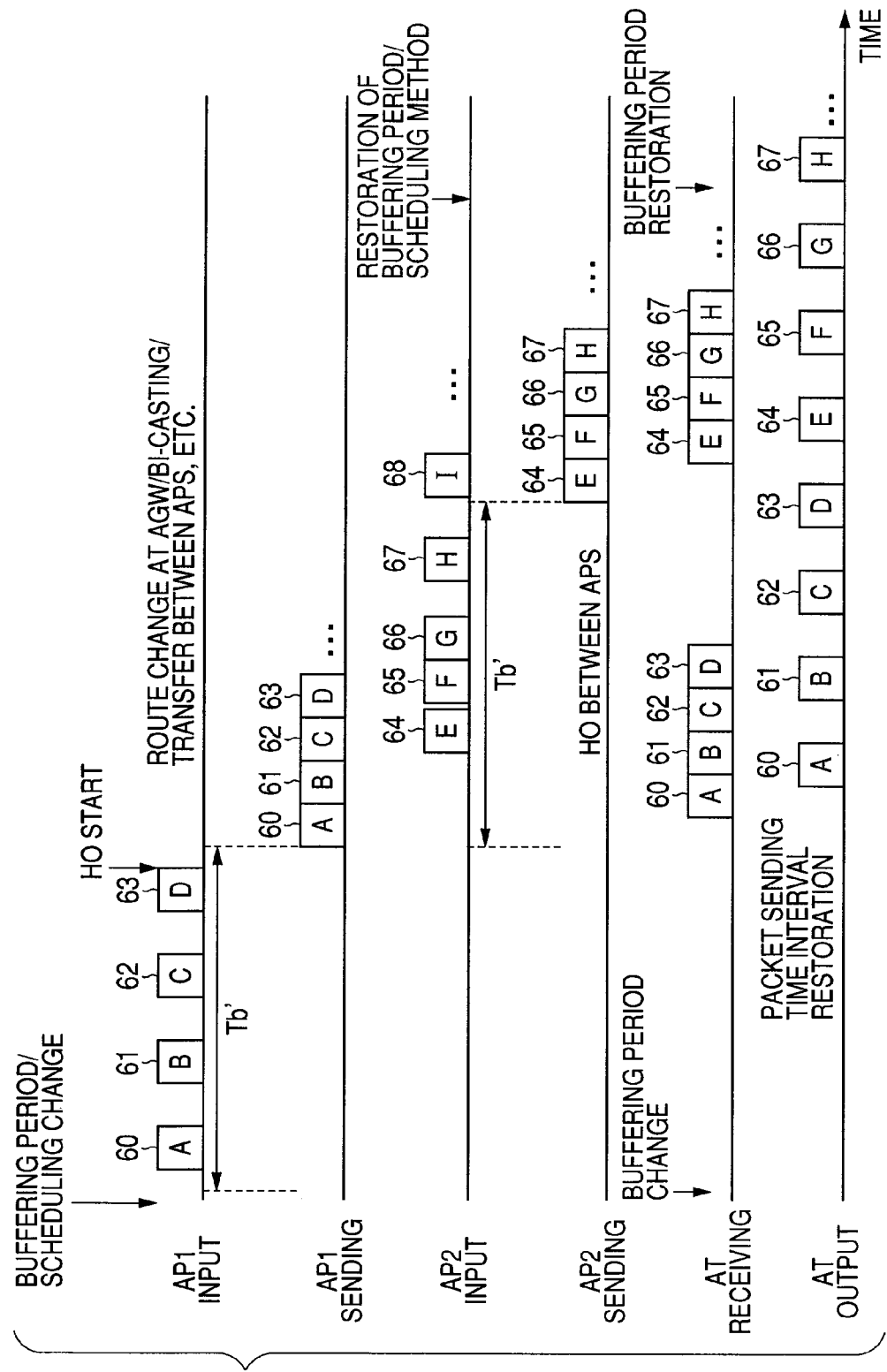
FIG. 3 is a time series chart of packet sending/receiving of the present invention in a wireless system.

FIG. 3 shows an example of time series processings for changing a buffering period and a scheduling method of packet sending to a wireless medium upon sending packets forward (from AP to AT) in the wireless system of the present invention.

It is premised here that each of the AP1 and the AT6, upon estimating occurrence of a hand-over event, increases the buffering period to Tb' from Tb before inputting packets A to D. It is also premised here that the AP1, upon estimating occurrence of a hand-over event, changes the current scheduling method for another before inputting packets A to D.

Figure 1:
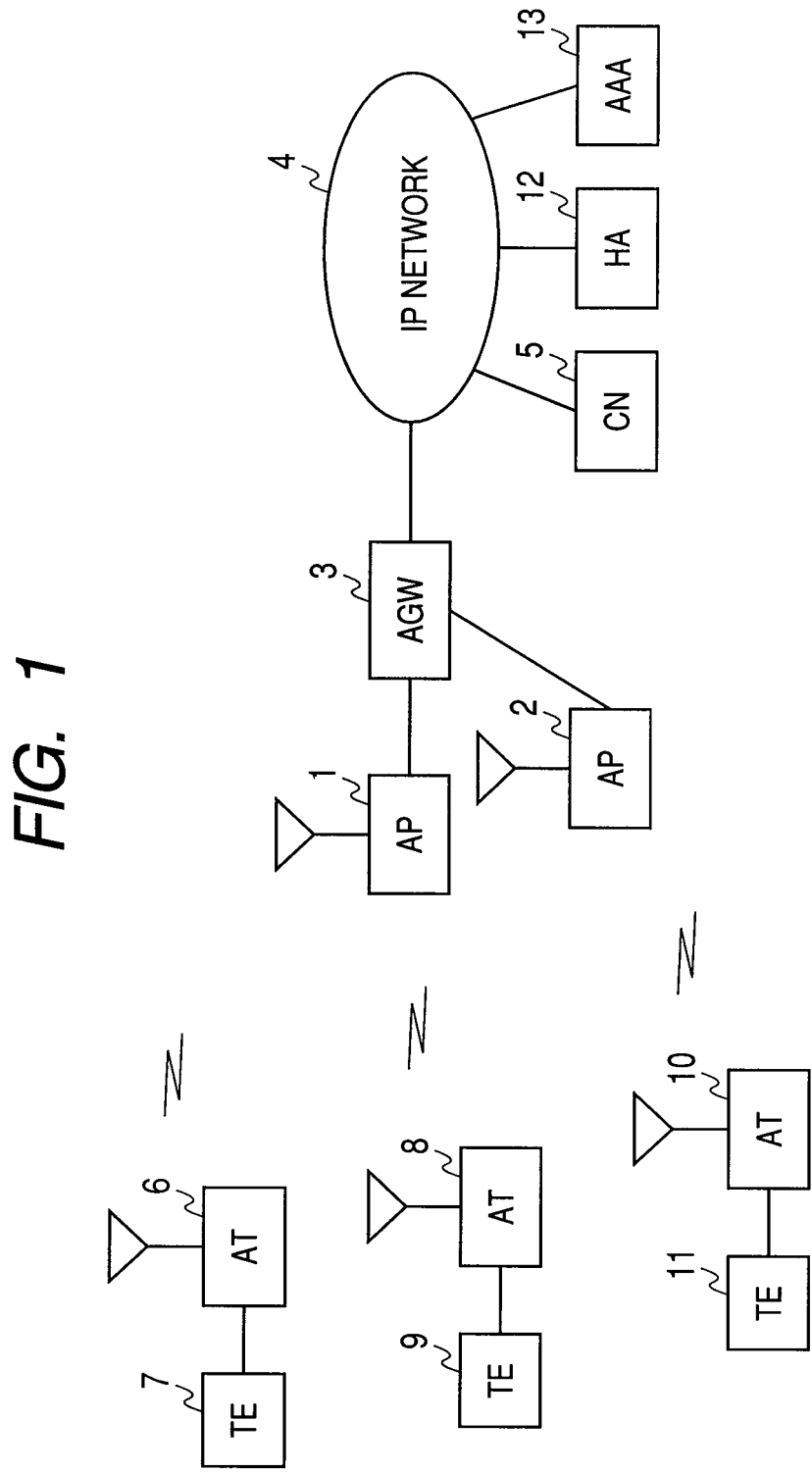
FIG. 1 is a wireless system of the present invention.
Figure 2:
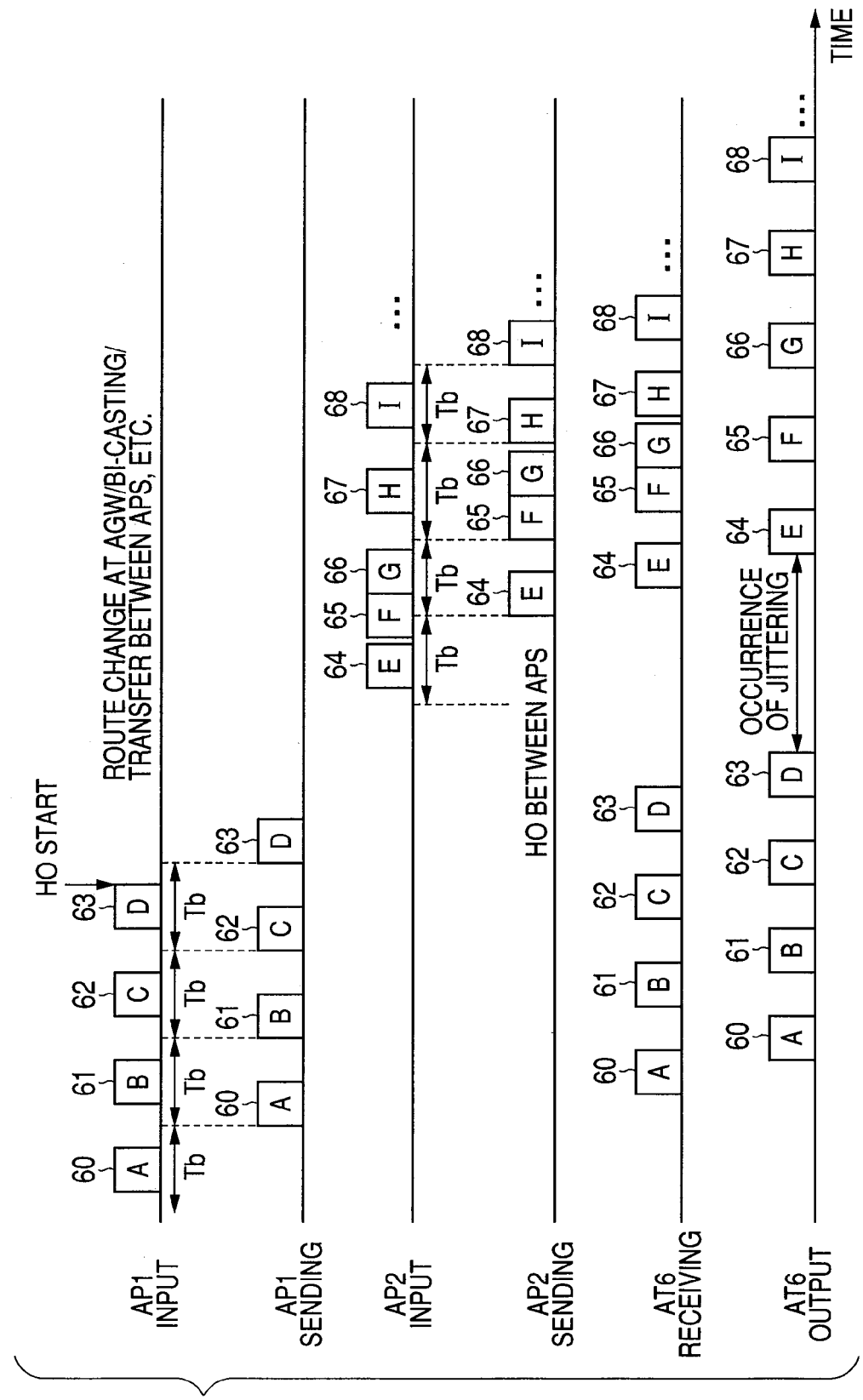
FIG. 2 is a time series chart of conventional packet sending/receiving in a wireless system.

In case of the conventional scheduling method shown in FIG. 2, the AP1 sends packets A to D inputted in each buffering period Tb to an object wireless block independently in each buffering period. And due to that scheduling method change, the AP1 generates a burst consisting of the packets A to D inputted respectively in the buffering period Tb' and sends the burst to the object wireless block as shown in FIG. 3.

The base station thus comes to send each burst generated from the packets inputted thereto in each buffering period Tb'. In this case, for example, the AP1 can estimate occurrence of a hand-over event from the wireless communication channel quality of the AT6, which the AP1 receives as control information. Furthermore, the AT6 can estimate occurrence of a hand-over event from the communication quality determined by the intensity of the signal received from the AP1, information error rate, etc.

If an AT or AP determines the hand-over procedure actually according to the circumstances, the hand-over procedure is executed between the AT and the AP. In an embodiment of the present invention, a hand-over processing is executed between the AT6 and the AP1/AP2 in a period between burst sending operations. For example, it is assumed in FIG. 3 that the AT6 determines execution of a hand-over processing when the AP1 receives the packet D. Then, the AT6 exchanges messages with the AP1/AP2 in a period between when the AP1 sends a burst consisting of packets A to D and when the AP2 sends a burst consisting of packets E to H, thereby executing the hand-over processing.

In this case, the hand-over processing is completed within a wireless block between burst sending operations (e.g., between the burst consisting of packets A to D and the burst consisting of packets E to H) even when the hand-over procedure takes much time and the packet-over is not ended within a predetermined packet sending time interval. And the burst sending time interval can be fixed without being influenced by hand-over processings. The AT6 can thus send packets to the TE7 at fixed time intervals.

The AT6 may also use such a shaping method as the token bucket, etc. to control packet sending to the TE7. If an application program adds a generation time stamp to each packet at the CN5, the AT6 may send each packet to the TE7 at the time specified by the time stamp. In this case, the AT6 can output the consecutive packets A to H to the TE7 at fixed time intervals and with no delay jittering.

A fixed time after a hand-over processing is started, each of the AP2 and the AT6 returns the buffering period to Tb from Tb'. Furthermore, the AP2 restores the original scheduling method. In other words, the AP2 comes to send the packets received in each buffering period Tb to a wireless block independently in each buffering period. The buffering period Tb is increased to Tb' only at a hand-over processing including large sending delay jittering, so that the sending delay occurrence and buffer capacity can be reduced during communications other than hand-over processings.

Buffering period and scheduling method may not be changed immediately even when occurrence of a hand-over event is estimated due to such conditions as signal intensity and error rate. For example, if any of the above changes is made during sending consecutive packets, the sending delay occurrence increases. Thus such a change might affect the communication quality badly. In this case, for example, buffering period and scheduling method may be changed when a break occurs in a packet flow in the transition from a voiced section to a unvoiced section under the conditions as described above. After a hand-over processing, the original buffering period and scheduling method can be restored in the transition from a voiced section to an unvoiced section.

It is also conceivable that the buffering period at each of the AT and the AP is always set longer enough than the hand-over processing time. In this case, however, the buffering period increases, thereby the end-to-end sending delay increases. It is known that in order to give satisfaction to users, it is better if the end-to-end sending delay is minimized and it is needed the sending delays to keep less than a certain value, as a result of subjective evaluation of voice communications, etc. This method does not require such an increase of the end-to-end fixed sending delay except for the sections before and after each hand-over processing. Furthermore, the method requires just a short buffering period except for the sections before and after each hand-over processing, so that the memory capacity in each of the AT and AP can be reduced.

There is also a method conceivable to change such traffic properties as time interval, size, etc. of the packets generated by an application program wirelessly so as to set a longer time interval for the packets generated by the application program for voices, images, etc. that are handled at TE and CN than the required hand-over processing time. In this case, however, end-to-end signaling is required and it takes much time. On the other hand, according to the present invention, the signaling is required only in an access system to prevent the above problems.

[Example of Dynamic Buffering/Scheduling Method Change in Reverse Link]

Figure 4:
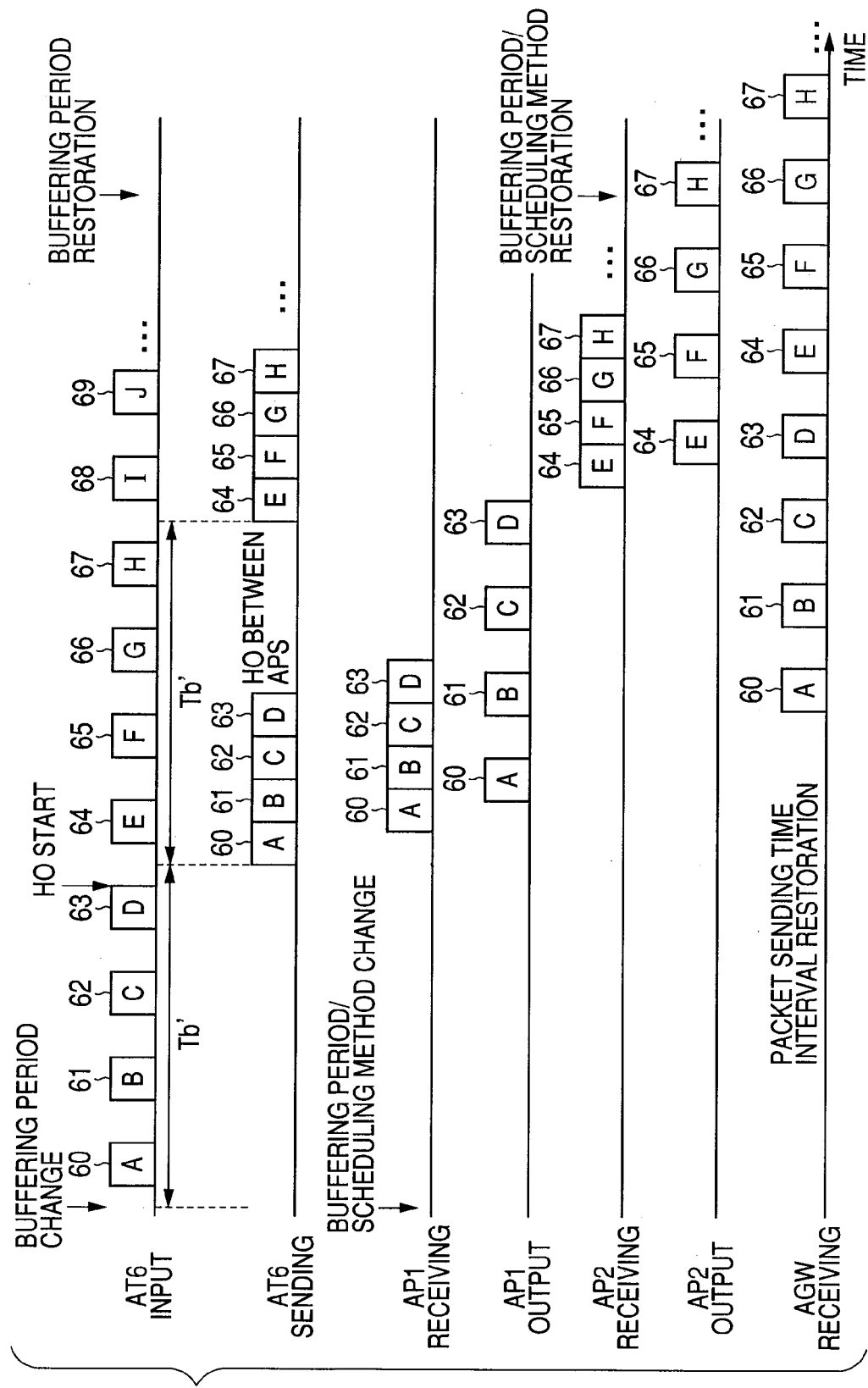
FIG. 4 is another time series chart of packet sending/receiving of the present invention in a wireless communication system.

FIG. 4 shows an example of the time series processings for changing both the current buffering period and scheduling method of packet sending to a wireless medium in the reverse link (from AT to AP) in the wireless system of the present invention.

Hand-over processings may be executed simultaneously in the forward link and in the reverse link. In some systems, it is also possible to execute those hand-over processings independently in the forward link and in the reverse link respectively. For example, in the reverse link, packets are sent through the AP1 and in the forward link, packets are sent through the AP2.

It is premised here that each of the AP1 and the AT6, upon estimating occurrence of a hand-over event, increases the buffering period to Tb' from Tb before inputting packets A to D. It is also premised here that if the required hand-over processing time is 20 ms, each of the AP1 and the AT6 increases the buffering period to Tb'=40 ms from Tb=10 ms. Generally, the Tb' is required to be longer enough than the required hand-over processing time.

The AP1, upon estimating occurrence of a hand-over event, changes the current scheduling method for another before the AT6 inputs packets A to D.

In case of the conventional scheduling method shown in FIG. 2, the AP1 sends packets A to D inputted in each buffering period Tb to an object wireless block independently in each buffering period. And upon a scheduling method change, the AT6 comes to generate a burst consisting of the packets A to D inputted in the buffering period Tb' and sends the burst to the object wireless block as shown in FIG. 4.

As to be described later, the AP1 makes scheduling of the packet sending by the AT6 and notifies the AT6 of the sending timing as control information. The AP2, which is a hand-over destination, continues the scheduling for sending each burst of packets (e.g., a burst consisting of packets E to H as shown in FIG. 4). The base station thus comes to send a burst in each buffering period Tb'. In this case, the AP1 can estimate occurrence of a hand-over event, for example, from the wireless communication quality of the AT6, received as control information. Furthermore, the AT6 can estimate occurrence of a hand-over event from the communication quality information such as signal intensity, information sending error rate, etc. received from the AP1.

If the AT or AP determines execution of a hand-over event actually under the circumstances, the hand-over procedure is executed between the AT and the AP. In an embodiment of the present invention, the hand-over procedure is executed between the AT6 and the AP1/AP2 in a period between burst sending operations. For example, in FIG. 4, it is premised that the AT6 determines execution of a hand-over event upon receiving the packet D. The AT6 exchanges messages with the AP1/AP2 to execute the hand-over procedure in a period between when the AT6 sends a burst consisting of packets A to D and when the AT6 sends another burst consisting of packets E to H. The AP then takes out those packets from the received burst, then is enabled to send those packets to the AGW3 at fixed time intervals.

The AP1 and AP2 may control packet sending to the AGW3 with use of such a shaping method as the token bucket, etc. Furthermore, if the TE7 adds a generation time stamp to each packet, the AP1 and AP2 may send each packet to the AGW3 at the time specified by the time stamp.

In this case, even when the hand-over procedure takes much time, thereby it cannot be completed within a predetermined packet sending time interval, the hand-over processing is completed within the predetermined packet sending time interval of a wireless block (e.g., between the burst consisting of packets A to D and the burst consisting of packets E to H). And the burst sending time interval can be fixed without being influenced by hand-over processings. Thus the AGW3 can receive those packets A to H at fixed intervals after receiving a burst, thereby eliminating the sending delay jittering.

A fixed time after a hand-over processing is started, each of the AP2 and the AT6 returns the buffering period to Tb from Tb'. Furthermore, the AP2 restores the original scheduling method. In other words, the AP2 comes to send the packets inputted to the AT6 in each buffering period Tb to an object wireless block independently in each buffering period. The buffering period Tb is increased to Tb' only at hand-over processings having large sending delay jittering respectively, so that the sending delay and buffer capacity can be reduced during communications other than those hand-over processings.

Buffering period and scheduling method may not be changed immediately even when a hand-over event is estimated due to such conditions as signal strength and error rate. For example, if any of the above changes is made during a communication of consecutive packets, the sending delay increases. As a result, such a change might affect the communication quality badly. In this case, for example, buffering period and scheduling method may be changed when a break occurs in a packet flow in the transition from a voiced section to a unvoiced section under the conditions as described above. Similarly, the original buffering period and scheduling method may be restored in the transition from a voiced section to an unvoiced section after a hand-over processing.

It is also conceivable that the buffering period at each of the AT and the AP is always set longer enough than the hand-over processing time. In this case, however, the buffering period increases and the end-to-end sending delay increases. It is known that in order to give satisfaction to users, it is better if the end-to-end sending delay is minimized and it is needed the sending delays to keep less than a certain value, as a result of subjective evaluation of voice communications, etc.

This method does not require an increase of the end-to-end fixed sending delays except in the sections before and after each hand-over processing. Furthermore, the method requires just a short buffering period except for the sections before and after each hand-over processing, so that the memory capacity can be reduced in each of the AT and AP.

There is also a method conceivable to change such traffic properties as time interval, size, etc. of the packets generated by an application program wirelessly so as to set a longer time interval for the packets generated by the application program for voices, images, etc. that are handled at TE and CN than the required hand-over processing time. In this case, however, end-to-end signaling is required and it takes much time. On the other hand, according to the present invention, only the signaling in an access system is required to prevent the above problems.

[Example of Hand-Over Calling Flow: Description for the Processings]

Figure 5:
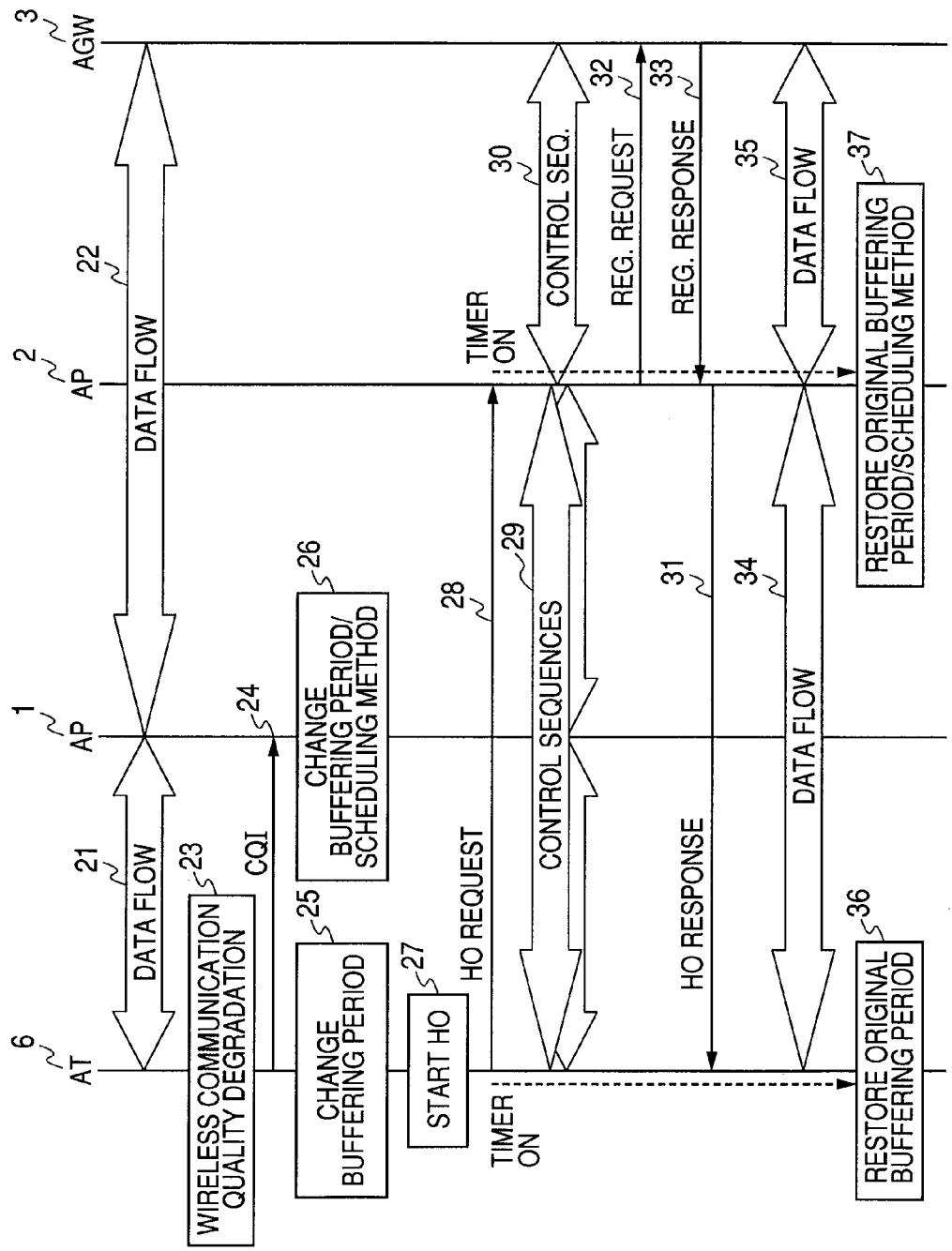
FIG. 5 is an explanatory diagram of a hand-over calling flow of the present invention.

FIG. 5 shows an example of a calling flow of the hand-over procedure according to the present invention when the AT6 executes a processing of hand-over from the AP1 to the AP2.

In this case, the data flow may be in any of the forward link and reverse link. It is premised here that the AT6 makes communications through the AP1 in data flows 21 and 22 and goes into a state in which the AT6 estimates occurrence of a hand-over event due to the degradation of the wireless communication quality.

The AT6 sends wireless communication quality information to the AP1 according to the CQI (Channel Quality Index) 24. And the AT6 changes the buffering period to Tb' from Tb in a buffering period change process 25.

The AP1 then changes the current buffering period and scheduling method (process 26) for others according to the CQI 24.

If the communication state changes, the AT6 determines whether to start the hand-over procedure (process 27) and sends a hand-over request message (HO Request 28) to the AP1.

The AP1 may begin sending messages for determining execution of the hand-over procedure and requesting the hand-over procedure. The AP1 may adjust the hand-over execution timing as needed after receiving the HO Request 28.

The AT6, upon sending the HO Request 28 to the AP2, starts up the timer for managing the new buffering period. Upon receiving the HO Request 28, the AP2 starts up the timer for managing the new buffer/scheduler time.

In the control sequences 29 and 30, the AT6, AP1, and AP2 exchange messages with each another with respect to a hand-over processing. The messages are exchanged at this time according to the wireless communication system standards such as the wireless connection change, AT address assignment, QoS setting, admission control, accounting, and authentication, etc.

The AP2, after exchanging those messages of the control sequences 29 and 30, sends an HO response 31 to the AT6. Furthermore, the AP2 sends a registration request 32 to the AGW3 to establish a connection to the AGW3.

The AGW3 returns the registration response 33 to the AP2 and changes the route through the AP1 for the route through the AP2.

The AT6 then begins communications through the AP2 in the data flows 34 and 35. After a certain time measured by a timer, the AT6 restores the original buffering period (process 36).

Furthermore, the AP2 restores both the original buffering period and the original scheduling method (process 37).

[Example of Hand-over Calling Flow: Relationship in Timing between Data Burst and Hand-Over Processing]

Figure 6:
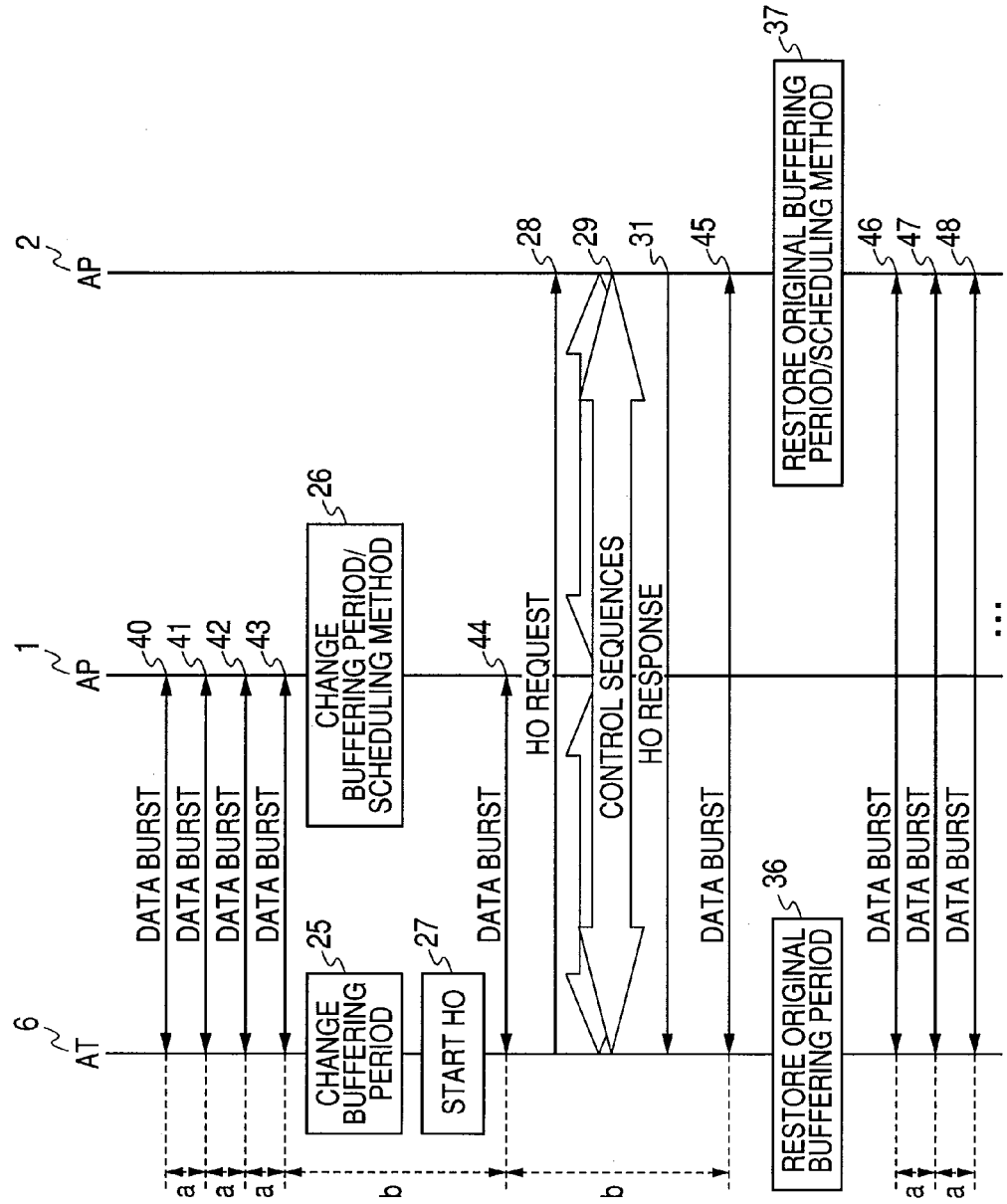
FIG. 6 is another explanatory diagram of a hand-over calling flow of the present invention.

FIG. 6 shows an example of a calling flow when the AT6 executes hand-over from the AP1 to the AP2.

In this case, the data sending direction may be in any of the forward link and reverse link. It is premised here that the AT6 sends/receives data bursts 40 to 43. The data bursts 40 to 43 are generated from, for example, the packets received by the AP or AT in the buffering period Tb as shown in FIG. 2. Those bursts are sent in each period "a" respectively.

If the wireless communication quality is degraded and occurrence of a hand-over event is estimated, the AT6 changes the buffering period to Tb' from Tb (process 25).

The AP1 then goes to the process 26 to change both the buffering period and the scheduling method for others.

Due to this change of the scheduling method, the AP or AT6 sends data bursts 44 and 45 generated from the packets received by the AP or AT in the buffering period Tb'.

The data burst 44 corresponds to the burst consisting of the packets A to D shown in FIGS. 3 and 4 and the data burst 45 corresponds to the burst consisting of the packets E to H. The bursts 44 and 45 are sent in each period "b" that is longer than the period "a".

When the data burst 44 is sent, the AT6, AP1, and AP2 exchange messages of the HO request 28, control sequences 29, and HO response 31 with each another before the data burst 45 is sent.

After the hand-over processing ends, the AT6 goes back to the original buffering period (process 36).

And the AP2 restores both the original buffering period and the original scheduling method (process 37).

When the original scheduling method is restored, the AT6 and AP2 sends data bursts 46 to 48 in a period "a" respectively. As described above, therefore, even when message exchange of HO request 28, control sequences 29 and HO response 31 is not finished within the burst sending time interval in the period "a", the message exchange can be completed within the burst sending time interval in the period "b" (e.g., between data bursts 44 and 45).

[Example of Scheduling Calling Flow in Reverse Link]

Figure 7:
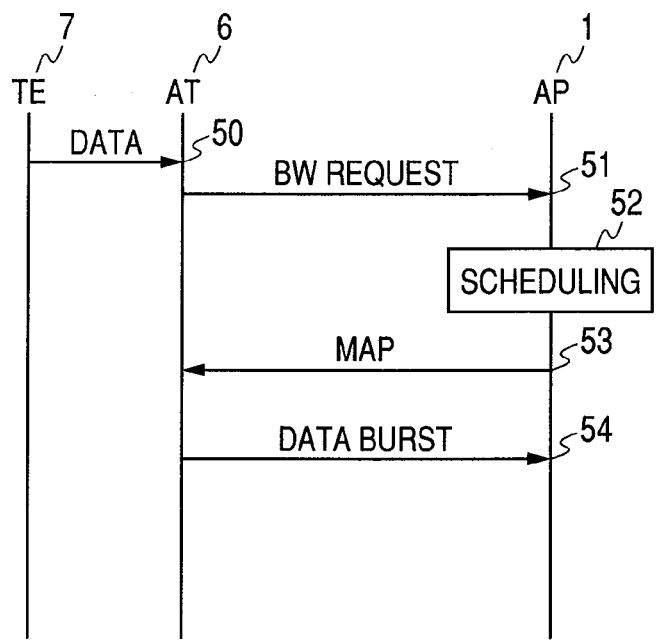
FIG. 7 is an explanatory diagram of a calling flow of scheduling of the present invention.

FIG. 7 shows an example of a calling flow of scheduling in the reverse link.

At first, the TE7 sends data 50 to the AT6. The data 50 includes, for example, packets A to D as shown in FIG. 4.

The AT6 then notifies the AP1 of the amount of the data 50 with a message (BW (BandWidth) request 51). And the AT6 notifies the AP1 of the amount of control information other than the data 50 with the message (BW request 51) as needed to request a sending band width. An example of the message format for requesting this sending band width is described in the section 6.3.2.1.2.1.2 of IEEE Std 802. 16e-2005, (Feb. 28, 2006)/IEEE Std 802. 16-2004/Cor1 6.3.5.2.

The control unit 91 of the AP1 determines a sending time for the data 50 in the scheduling process 52.

The AP1, upon receiving BW requests 51 from a plurality of ATs, arbitrates those requests not to cause conflictions among the sending times of those ATs. For example, the control unit 91 of the AP1 determines sending of a burst consisting of the packets A to D as shown in FIG. 4 at the timing of the data burst 44 shown in FIG. 6. The control unit 91 of the AP1, if having control information received from the AT6, determines both size and timing of the control information to be sent out. The control unit 91 of the AP1 then creates a map 53 for specifying the data burst, as well as both size and timing of the control information to be sent by the AT6 wirelessly and notifies the AT6 of the map 53. An example of the message format for specifying both size and timing of the information to be sent out in the reverse link is described in the section 6.3.2.3.4 of IEEE Std 802. 16e-2005, (Feb. 28, 2006)/IEEE Std 802. 16-2004/Cor1 6.3.5.2.

The control unit 81 of the AT6 analyzes the received map 53.

The AT6 then sends the data burst 54 that includes the data 50 to a wireless medium at the specified size and timing. Furthermore, the AT6 sends the control information such as messages, etc. required for the hand-over procedure to the wireless medium at the specified size and timing.

For example, the AT6 generates a data burst 54 that includes the packets A to D shown in FIG. 4 and sends the burst at this time. The above procedure is repeated between the AT6 and the AP1 and the AT6 sends bursts wirelessly according to the scheduling of the AP1. For example, a base station and a mobile station may usually repeat the above procedure in each period "a" and if occurrence of a hand-over event is estimated or the event is being executed currently, the base station and the mobile station may repeat the above procedure in each period "b". If scheduling is enabled only in each period "a", the base station and the mobile station may repeat the above procedure usually in each period "a" and if occurrence of a hand-over event is estimated or the event is being executed currently, the base station and the mobile station may repeat the above procedure in each period several times as long as the period "a".

[Example of a Calling Flow of Scheduling in the Forward Link]

Figure 8:
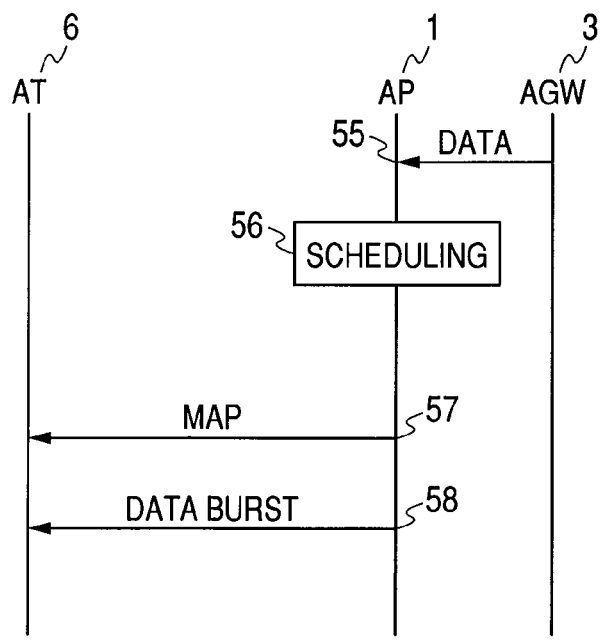
FIG. 8 is another explanatory diagram of a calling flow of scheduling of the present invention.

FIG. 8 shows an example of a calling flow of scheduling in the forward link.

At first, data 55 is inputted to the AP1 from the AGW3. For example, the data 55 includes the packets A to D as shown in FIG. 3.

The control unit 91 of the AP1 determines a sending time for the data 55 in the scheduling process 52. The AP1, if having any control information to be sent out except for the data 55, the control unit 91 determines the sending time for the control information in the scheduling process 56.

The AP1, if having information to be sent/received to/from a plurality of ATs, arbitrates the sending times of the AP and each of the ATs to prevent conflictions. For example, the AP1 determines sending of a burst consisting of the packets A to D shown in FIG. 3 at the timing of the data burst 44 shown in FIG. 6.

The control unit 91 of the AP1 sends the map 57 to the AT6 to notify the size and timing of both the data burst and the control information to be sent out wirelessly thereto by itself. An example of the message format for specifying both size and timing of the information to be sent out in the forward link is described in the section 6.3.2.3.2 of IEEE Std 802. 16e-2005, (Feb. 28, 2006)/IEEE Std 802. 16-2004/Cor1 6.3.5.2.

The AP1 sends the data burst 58 that includes both data 55 and control information to the wireless medium at the determined size and timing. For example, the AP1 stores the packets A to D shown in FIG. 3 in the data burst 58, then sends the data burst 58 to the wireless medium. Furthermore, for example, the AP1 sends control information such as messages required for the hand-over procedure.

The control unit of the AT6 analyzes the received map 57.

The AT6 recognizes the size and timing information specified in the map 57 as the information addressed to itself, then receives the information.

The above procedure is repeated between the AT6 and the AP1; the AT6 sends bursts wirelessly in accordance with the scheduling of the AP1. For example, the base station and the mobile station may repeat the above procedure in each period "a" in the normal state and if occurrence of a hand-over event is estimated or the event is being executed currently, the base station and the mobile station may repeat the above procedure in each period "b". If scheduling is enabled only in each period "a", the base station and the mobile station may repeat the above procedure in each period "a" in the normal state and if occurrence of a hand-over event is estimated or the event is being executed currently, the base station and the mobile station may repeat the above procedure in each period several times as long as the period "a".

[Example of HO Estimation]

Figure 9:
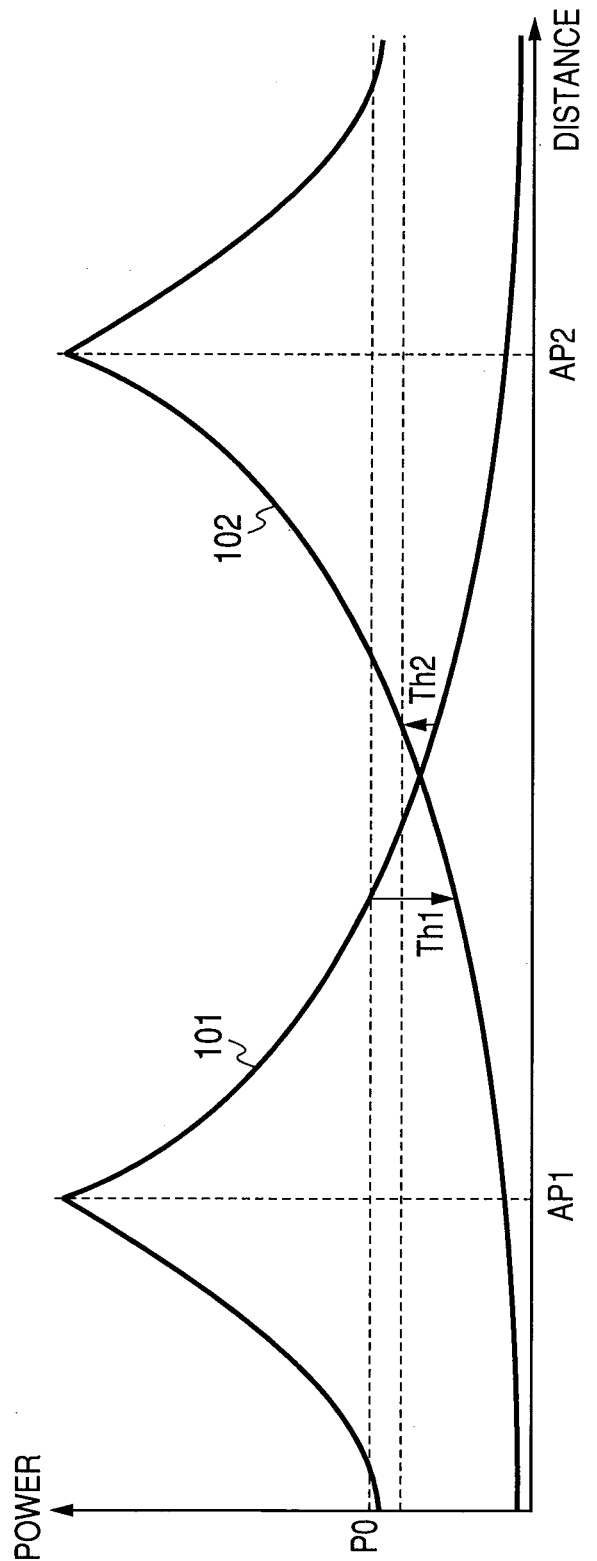
FIG. 9 is an explanatory diagram of hand-over estimation of the present invention.

FIG. 9 shows an example of hand-over estimation and initiation executed by the control unit of the AT or AP of the present invention.

The wireless unit of the AT measures the power 101 of the AP1 and the power 102 of the AP2 from the received signals and notifies the control unit of those measured powers 101 and 102. It is premised here that the control unit of the AT sends such a message as the CQ 124 to notify the AP of the received powers respectively. Assume now that the AT connected to the AP1 is moved toward the AP2. In this state, the power 101 of the AP1 decreases more and the power 102 of the AP2 increases more as the AP1 goes closer to the AP2. The control unit of the AT or AP, if the power 101 of the AP1 falls under a predetermined threshold value (Th1) with respect to the power 102 of the AP2, estimates occurrence of a hand-over event and changes the buffering period and the scheduling method for others. The control unit of the AT or AP, if the power 101 of the AP1 falls under a predetermined value (P0), may estimate occurrence of a hand-over event and change both the buffering period and the scheduling method for others.

Assume now that the AT has got further closer to the AP2. The control unit of the AT or AP, if the power 102 of the AP2 falls under a predetermined threshold value (Th2) with respect to the power 101 of the AP1, initiates the procedure of hand-over from the AP1 to the AP2. In this example, the power of the AP is used to estimation and initiation of occurrence of a hand-over event, but another index such as an error rate, data throughput, etc. may be used for such the estimation and initiation of occurrence of a hand-over event.

[Concrete Examples of Scheduling and Burst Sending]

Figure 10:
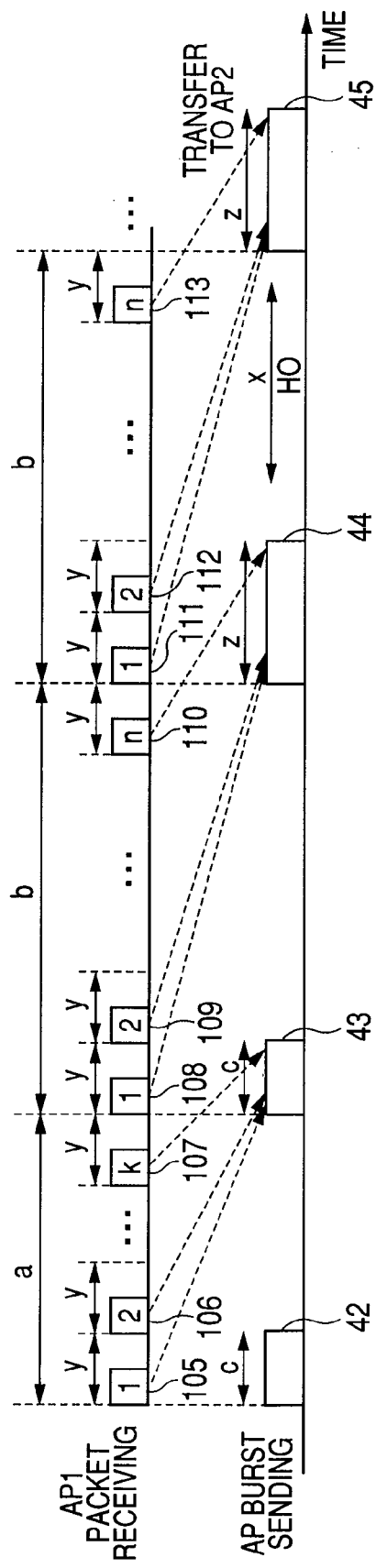
FIG. 10 is still another time series chart of packet sending/receiving of the present invention in a wireless system.

FIG. 10 shows a concrete example of scheduling and burst sending by AP.

The AP1 generates and sends out a burst in each period "a" [sec]. For example, the control unit of the AP1 generates a data burst 43 from "k" (k=1 possible) packets 105 to 107 and sends out the burst.

The control unit of the AP1 thus secures an area in its storage unit beforehand so as to store at least "k" packets therein. For example, if the packet size is "d" [byte], the control unit secures at least k*d [byte]. Then, when the AP1 estimates occurrence of a hand-over event, the AP1 increases the buffer capacity.

At this time, for example, the control unit of the AP1 secures an area in its storage unit so as to store at least "n" packets therein. For example, if the packet size is "d" [byte], the control unit secures an area of at least n*d [byte]. Furthermore, the control unit of the AP1 changes the current scheduling method for another to generate and send a burst in each period "b" [sec].

For example, the AP1 generates and sends a data burst 44 from "n" packets 108 to 110. Then, the AT executes the procedure of hand-over from the AP1 to the AP2, thereby the AP2 comes to send bursts. For example, the AP1 transfers packets 11 to 113 to the AP2. As a result, the AP2 sends a data burst 45.

It is assumed here that a period in which the AP1, AP2, and AT exchange messages required for the hand-over procedure is "x" [sec] and the length of the data burst 44 is "z" [sec] Then, the control unit of the AP1 makes scheduling so that messages required for the hand-over procedure are exchanged after (b−z)>x is satisfied and the data burst 44 is sent out.

If the packet time interval is assumed to be y [sec], the result becomes b=n*y [sec]. It the size of the data bursts 44 and 45 is assumed to be "e" [byte] and the wireless transmission rate is to be "f" [byte/sec], the result becomes z=e/f [sec]. And n>(x+e/f)/y is satisfied due to the condition (b−z)>x and the above relationship. In other words, the control unit of the AP1 generates data bursts 44 and 45 from the number of packets that exceeds (x+e/f)/y.

[Example of AT]

Figure 11:
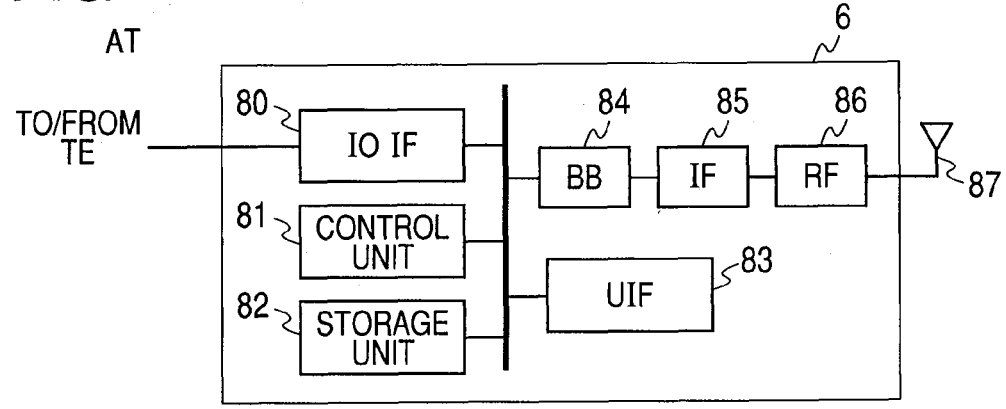
FIG. 11 is an explanatory diagram of a mobile station of the present invention.

FIG. 11 shows an example of the AT 6 of the present invention. This example can also apply to the AT 8 and AT 10.

The BB (Base Band unit) 84 executes a base band processing for signals sent and received wirelessly. The BB 84 also modulates sending signals and executes synchronous supplement and demodulating operations for received signals respectively.

The IF 85 processes signals of the wireless (IF) intermediate frequency. The IF 85 makes DA conversion for the base band signals inputted from the BB 84, then converts the signals to intermediate frequency signals to be output to the RF 86. Furthermore, the IF 85 makes AD (analog to digital) conversion for the wireless signals inputted from the RF 86, then outputs those digital signals to the BB 84.

The RF (wireless unit) processes signals of a radio frequency (RF). The RF 86 up-converts signals inputted from the IF 85 to wireless frequency signals and amplifies their sending power, then outputs the frequency signals to an antenna 87. The RF 86 also down-converts wireless signals inputted from the antenna 97 to intermediate frequency signals, then outputs the frequency signals to the IF 85.

The control unit 81 includes functions for managing the whole AT. The control unit 81 executes various processings such as assembling/disassembling/discarding packets to be sent/received, controlling the information sending timing, managing information in the storage unit 82, sending messages, analyzing received messages, and executing processings corresponding to those messages, and estimating hand-over events, and determining execution of the hand-over procedure.

The storage unit 82 holds data to be sent/received, as well as management information required for various controls.

The UIF 83 is a user interface used for a keyboard, display, speaker, or the like. The IO IF 80 is an input/output interface connected to a TE.

[Example of AP]

Figure 12:
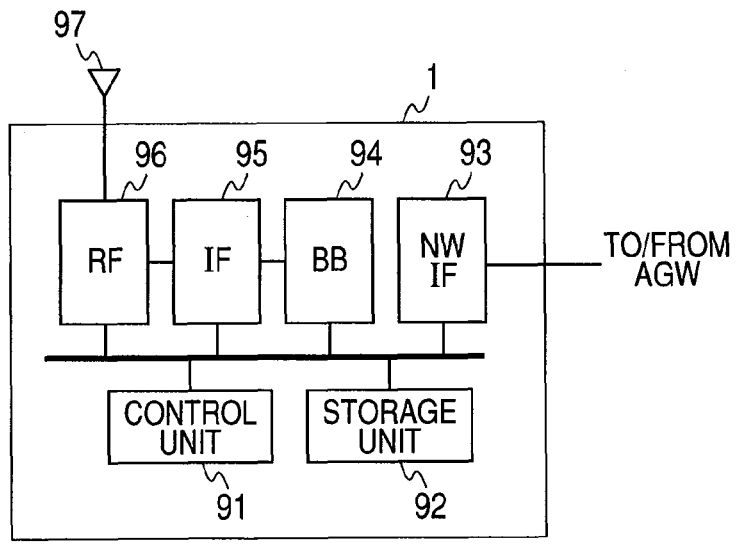
FIG. 12 is an explanatory diagram of a base station of the present invention.

FIG. 12 shows an example of the AP1 of the present invention. This example can also apply to the AP2.

The NW IF 93 is an interface used to connect the AGW 3 to a network.

The BB (Base Band) 94 executes base band processings for signals to be sent/received. The BB 94 modulates sending signals. The BB 94 also executes synchronous supplement and demodulate operations for received signals.

The IF 95 processes intermediate frequency (IF) signals. The IF 95 executes DA (digital to analog) conversion of base band signals inputted from the BB 94, converts those analog signals to intermediate frequency signals, then outputs the frequency signals to the RF 96. The IF 95 executes AD (analog to digital) conversion of signals inputted from the RF 96, then outputs those digital signals to the BB 94.

The RF (wireless unit) 96 processes signals of a radio frequency (RF). The RF 96 up-converts signals inputted from the IF 95 to radio frequency signals and amplifies their sending power, then outputs the frequency signals to an antenna 97. The RF 96 also down-converts radio signals inputted from the antenna 97 to intermediate frequency signals, then outputs the frequency signals to the IF 95.

The control unit 91 includes functions for managing the whole AP. The control unit 91 executes various processings such as assembling/disassembling/discarding packets to be sent/received wirelessly and through the NW IF 239, controlling the information sending timing, scheduling wireless sending by the self station and the AT connected to the self station, managing information in the storage unit 92, generating/sending/analyzing messages, and estimating hand-over events, and determining execution of the hand-over procedure.

The storage unit 92 holds data to be sent/received, as well as management information required for various controls.

[Example of AT Processings: Communication Quality Monitoring]

Figure 13:
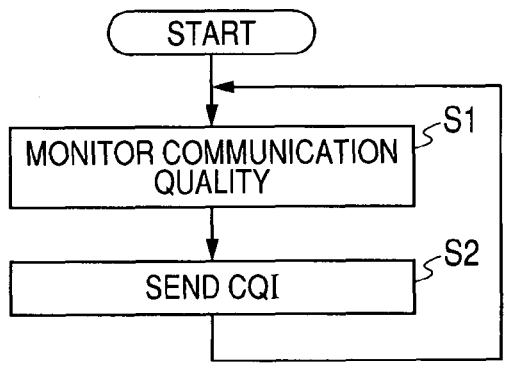
FIG. 13 is a flowchart of the processings of the mobile station of the present invention.

FIG. 13 shows an example of the communication quality monitoring processings by the control unit 81 of the AT.

S1: The control unit 81 obtains communication quality information to be measured by the wireless unit. The communication quality information is, for example, intensity of signals received by the AT from a base station.

S2: The control unit 81 creates a CQ 24 with use of the communication quality information, then sends the CQ 24 to the AP.

[Example of Processings by AT: Hand-Over]

FIG. 14 shows an example of hand-over processings executed by the control unit 81 of the AT.

S3: The control unit 81 checks the circumstances for possibility of hand-over occurrence with use of the information obtained in S1. The control unit 81, if the power 101 of the AP1 falls under a predetermined threshold value (Th1) with respect to the power 102 of the AP2 as described above, determines possibility of hand-over occurrence under the circumstances.

S4: The control unit 81 thus expands the buffer area secured in the storage unit 82 and used for packets. At this time, for example, the control unit 81 expands the buffer area to n*d [byte] from k*d [byte] as described above.

S5: The control unit 81 then determines whether to execute the hand-over procedure according to the information obtained in S1. Concretely, if the power 102 of the AP2 exceeds a predetermined threshold value (Th2) with respect to the power 101 of the AP1, the control unit 81 determines execution of the procedure of hand-over from AP1 to AP2.

S9: If not determining execution of the hand-over procedure in S5, the control unit 81 checks the circumstances for possibility of hand-over occurrence with use of the information obtained in S1. The processing in S9 is the same as that in S3.

If occurrence of a hand-over event is estimated in S9, the control unit 81 returns to S5 to execute the processing therein.

S8: If occurrence of a hand-over event is not estimated due to the state change in S9, the control unit 81 restores the original size of the buffer area. Concretely, the control unit 81 restores the size of the buffer area secured for packets to k*d [byte] from n*d [byte].

S6: If execution of the hand-over procedure is determined in S5, the control unit 81 executes the hand-over procedure. The control unit 81 then starts up the HO timer for measuring the time elapsed since the start of the hand-over procedure and sends messages required for the hand-over execution (e.g., HO request 28, control sequence 29, and HO response 31).

S7: The control unit 81 checks if the HO timer reaches the set value.

S8: If the HO timer reaches the set value in S7, the control unit 81 restores the original size of the buffer area. Upon ending the processing in S8, the control unit 81 returns to S1 to execute the processing therein.

[Example of AT Processings: Scheduling]

FIG. 15 shows an example of scheduling by the control unit 81.

S10: The control unit 81 checks if there is any packet data or control information to be sent out.

S11: If there is any information to be sent in S10, the control unit 81 requests the AP for a band width so as to send the information thereto. For example, the control unit 81 creates a BW request 51 and sends the request to the AP.

S12: The control unit 81 then waits for a message to be received from the AP. The message specifies a sending timing. For example, the AT receives the map 53 and analyzes the map 53 here.

If there is no map received in S12, the control unit 81 returns to S10 to repeat the processing therein.

S13: If receiving the map in S12, the control unit 81 sends/receives information at a timing specified in the map.

[Example of AP Processings: Hand-over Processings by Hand-Over Source AP]

FIG. 16 shows an example of hand-over processings by the control unit 91 of the AP.

S14: The control unit 91 checks the circumstances for possibility of hand-over occurrence according to the information of the CQI 24 obtained from the AT. If the power 101 of the AP1 falls under a predetermined threshold value (Th1) with respect to the power 102 of the AP2 at this time as described above, the control unit 91 estimates occurrence of a hand-over event.

S15: The control unit 91 thus expands the packet buffer area secured in the storage unit 92 and changes the current scheduling method for the other. Concretely, the control unit 91 expands the buffer area to n*d [byte] from k*d [byte] at this time. Furthermore, the control unit 91 changes the current method for sending a burst consisting of "k" packets that are collected in each "a" period, for example, for a method for sending a burst consisting of "n" packets that are collected in each "b" period.

S16: The control unit 91 determines whether to execute the hand-over procedure according to the information obtained from the CQI 24. Concretely, if the power 102 of the AP2 exceeds a predetermined threshold value (Th2) with respect to the power 101 of the AP1, the control unit determines execution of the procedure of hand-over from the AP1 to the AP2.

S19: If not determining execution of the hand-over procedure in S16, the control unit 91 checks the current state for possibility of hand-over occurrence according to the information obtained from the CQI 24. The processing in S19 is the same as that in S14.

If estimating occurrence of a hand-over event in S19, the control unit 91 returns to S16 to execute the processing therein.

S20: If determining in S19 that the previous state is restored and occurrence of a hand-over event is not estimated any more in that state, the control unit 91 restores the original size of the buffer area and the original scheduling method respectively. Concretely, the control unit 91 returns the size of the packet buffer area to k*d [byte] from n*d [byte] and restores the original scheduling method, for example, so as to send a burst consisting of "k" packets that are collected in each "a" period from the method for sending a burst consisting of "n" packets that are collected in each "b" period. Completing the processing in S20, the control unit 91 returns to S14 to repeat the processing therein.

S17: If determining in S16 to execute the hand-over procedure, the control unit 91 executes the procedure. The control unit 91 then exchanges messages required for the hand-over procedure (e.g., HO request 28, control sequence 29, and HO response 31) with the object unit.

S18: After executing the hand-over procedure in S17, the control unit 91 releases the buffer area secured in its storage unit for the AT executed the hand-over and terminates the scheduling with respect to the AT.

[Example of AP Processings: Hand-Over at Hand-Over Destination, AP]

FIG. 17 shows an example of the hand-over processings by the AP control unit 91.

S21: The control unit 91 waits for reception of an HO request 28.

S22: Upon receiving the HO request 28, the control unit 91 starts up the timer (HO timer) for measuring the time elapsed since the start of the hand-over processing.

S23: The control unit 91 secures a size of the buffer area required for the hand-over procedure. Concretely, the control unit 91 secures an n*d [byte] size for the buffer area at this time. Furthermore, the control unit 91 begins hand-over time proper scheduling with respect to sending/receiving to/from the destination AT. Concretely, the control unit 91 begins scheduling so as to send a burst consisting of "n" packets collected in each "b" period. This burst sending time interval can also be fixed even when AP is changed to another. The clock time can be adjusted and synchronized between those APs. The GPS signal that each AP receives from a satellite can be used for this synchronization. A protocol such as the NTP (Network Time Protocol) may also be used for this synchronization. It is also possible to send bursts at a predetermined time respectively so as to fix the burst sending time interval. For example, it is also possible to preset in both source and destination APs that bursts are to be sent to the destination AP when the clock time of each of the source and destination APs satisfies the condition "x[sec]+b[sec]*m". In that expression, the "x" denotes a proper offset value and the "m" denotes a natural number. It is also possible to use messages to be exchanged between hand-over source and destination APs to specify a sending time of bursts assumed just after a hand-over processing.

S24: The control unit 91 then executes the hand-over processing. At this time, the control unit 91 exchanges messages, for example, the control sequence 29, HO response 31 with the object AP. The AP control unit 91 makes scheduling so as to complete message exchanges between bursts to be sent (e.g., between data bursts 44 and 45).

S25: The control unit 91 then checks whether or not the HO timer has reached the set time.

S26: If determining in S25 that the timer has reached the set time, the control unit 91 restores the original buffer area size and the original scheduling method respectively. Concretely, the control unit 91 restores the buffer area secured in the storage unit to k*d [byte] from n*d [byte]. Furthermore, the control unit 91 restores the original scheduling method, for example, so as to send a burst consisting of "k" packets that are collected in each "a" period from the method for sending a burst consisting of "n" packets that are collected in each "b" period. If the HO timer has not reached the set time yet in S25, the control unit 91 repeats the processing in S25 and waits until the preset time is reached.

[Example of AP Processings: Scheduling]

FIG. 18 shows an example of scheduling by the AP control unit 91.

S27: The control unit 91 checks any of packet data and control information to be sent by the AP or AT for presence. The information to be sent by the AT is identified by a band width request (e.g., BW request 51) received by the AP.

S28: If determining in S27 that there is any information to be sent by the AT or AP, the control unit 91 determines a sending timing for the information.

S29: The control unit 91 creates a message for specifying the sending timing and sends the message to the AT. Concretely, the control unit 91 creates and sends the map 53 as the message at this time.

S30: The control unit 91 then sends/receives information to/from the AT at the time specified in the map 53.

The standards of the wireless system of the present invention may be determined freely; for example, they may be any of the EVD0, wireless LAN, and WiMAX standards. The AGW3 may also be any of, for example, the PDSN (Packet Data Service Node) of the EVD0, the PDIF (Packet Data Interworking Function) of the wireless LAN, and the ASN GW of the ASN GW (Access Service Network GateWay). Furthermore, the mobile station of the present invention may be formed by uniting AT and TE into one.

While the hand-over processing is executed between APs under the control of the same AGW in the above description, the hand-over processing may also be executed between APs that are under the control of different AGWs. Furthermore, while the application program sends fixed-sized packets at certain time intervals determined by the VoIP, etc. in the above description, the present invention can also apply to any of application programs that handle variable packet sending time intervals and variable packet sizes similarly.

The scheduling method described above is just an example. The bursts to be sent to a wireless medium in each of the periods "a" and "b" may not be sent at fixed time intervals. Although the AT/AP restores the original buffering period and/or scheduling method after a certain time measured by a timer, the AT/AP may also restore the original buffering period and/or scheduling method upon sending/receiving a message. For example, the AP1 may restore the original buffering period and scheduling method respectively after sending an HO response 31 shown in FIG. 5 and the AT6 may restore the original buffering period after receiving the HO response 31.

What is claimed is:

1. A wireless system used for packet communication between a plurality of base stations and a plurality of mobile stations, respectively,
   wherein each of the plurality of mobile stations includes a storage unit that holds packets and a unit that generates a burst consisting of those packets held in the storage unit;
   wherein each of the plurality of base stations includes a storage unit that holds packets, a unit that generates a burst consisting of those packets held in the storage unit, and a unit that schedules bursts to be sent from the base stations and the mobile stations;
   wherein the mobile station extends a packet buffering time upon estimating an occurrence of a hand-over event;
   wherein the base station extends a packet buffering time and changes a transmission interval of the bursts upon estimating an occurrence of the hand-over event; and
   wherein the base station changes the transmission interval of the bursts so that a period between when a burst is sent and when a next burst is to be sent is longer than a period when the base station and the mobile station exchange messages required to process the hand-over event with each other.

2. The wireless system according to claim 1,
   wherein each of the base station and the mobile station includes a unit that estimates an occurrence of a hand-over event.

3. The wireless system according to claim 1,
   wherein the base station changes a method for generating an information burst consisting of packets inputted to a base station or mobile station in a first period repetitively and sending the generated burst wirelessly; and
   changes a method for generating an information burst consisting of packets inputted to a base station or mobile station in a second period that is longer than the first period repetitively and sending the generated packet wirelessly.

4. The wireless system according to claim 1,
   wherein the system, if the occurrence of a hand-over event is estimated, increases at least either a storage area allocated in the storage unit of the mobile station that is used to hold packets to be sent to the base station or a storage area allocated in the storage unit of the base station that is used to hold packets to be sent to the mobile station.

5. A base station used for packet communication with a mobile station, comprising:
   a storage unit that holds packets;
   a unit that generates an information burst to be sent wirelessly from those packets held in the storage unit;
   a unit that schedules the information bursts to be sent from the base station and the mobile station, respectively;
   a unit that estimates occurrence of a hand-over event; and a unit that changes a transmission interval of the bursts if the unit estimates an occurrence of the hand-over event, wherein the mobile station extends a packet buffering time upon estimating occurrence of the hand-over event, and wherein the base station changes the transmission interval of the bursts so that a period between when a burst is sent and when a next burst is to be sent is longer than a period when the base station and the mobile station exchange messages required to process the hand-over event with each other.

6. The base station according to claim 5, wherein the unit that changes the transmission interval of the bursts changes a method for generating an information burst that stores packets inputted to a base station or mobile station in a first period and sending the generated burst repetitively; and changes a method for generating an information burst that stores packets inputted to a base station or mobile station in a second period that is longer than the first period and sending the generated burst wirelessly.

7. The base station according to claim 5, wherein the base station increases the storage area allocated to the storage unit thereof that is used to hold packets to be sent to the mobile station if the unit estimates occurrence of a hand-over event.

8. A mobile station used for packet communication with a base station, comprising:

a storage unit that holds packets;

a unit that generates an information burst to be sent wirelessly from those packets held in the storage unit; and a unit that estimates occurrence of a hand-over event, wherein the mobile station extends a packet buffering time and changes a transmission interval of the bursts upon estimating occurrence of the hand-over event if the unit estimates occurrence of the hand-over event; and wherein the mobile station changes a transmission interval of the bursts so that the period between when a burst is sent and when the next burst is to be sent is longer than a period when the base station and the mobile station exchange messages required to process the hand-over event with each other.

* * * * *